P. S. MARTIN.
AUTOMATIC EGG TURNING DEVICE.
APPLICATION FILED JULY 24, 1917.
Reissued June 24, 1919.
14,673
2 SHEETS—SHEET 1.
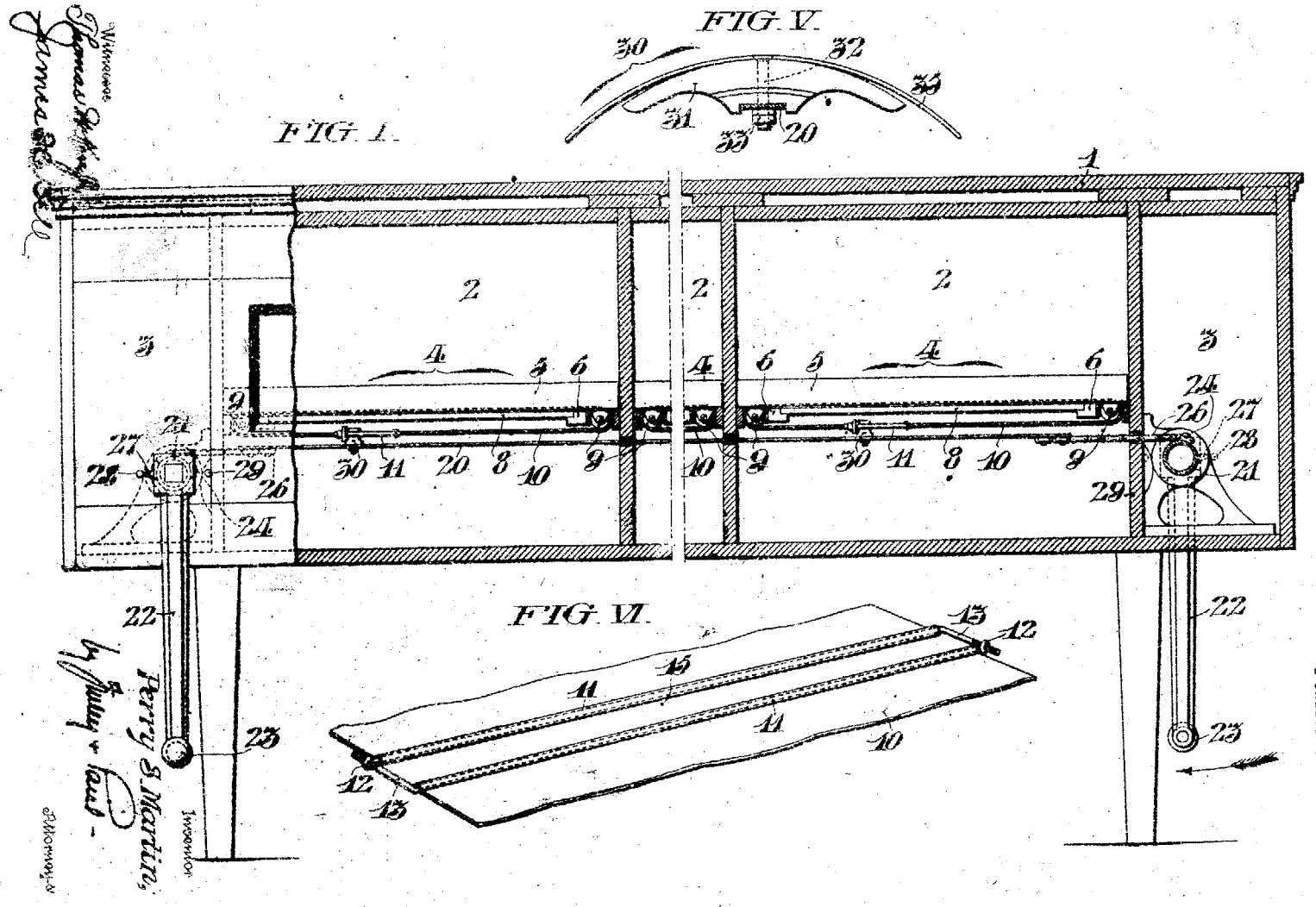

P. S. MARTIN.
AUTOMATIC EGG TURNING DEVICE.
APPLICATION FILED JULY 24, 1917.
Reissued June 24, 1919.
14,673.
2 SHEETS—SHEET 2.
FIG. II.
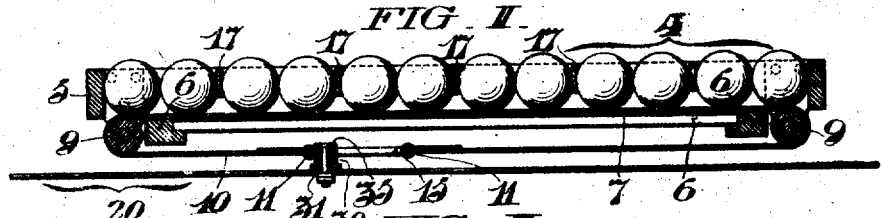
FIG. III.
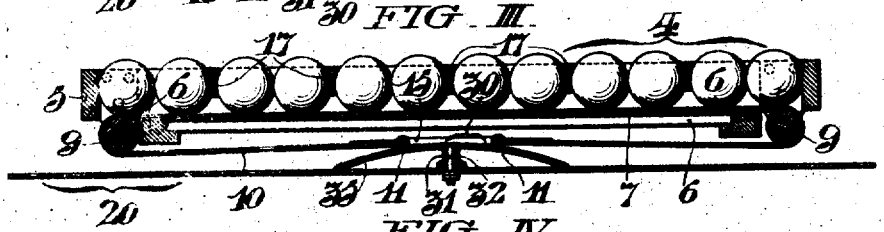
FIG. IV.
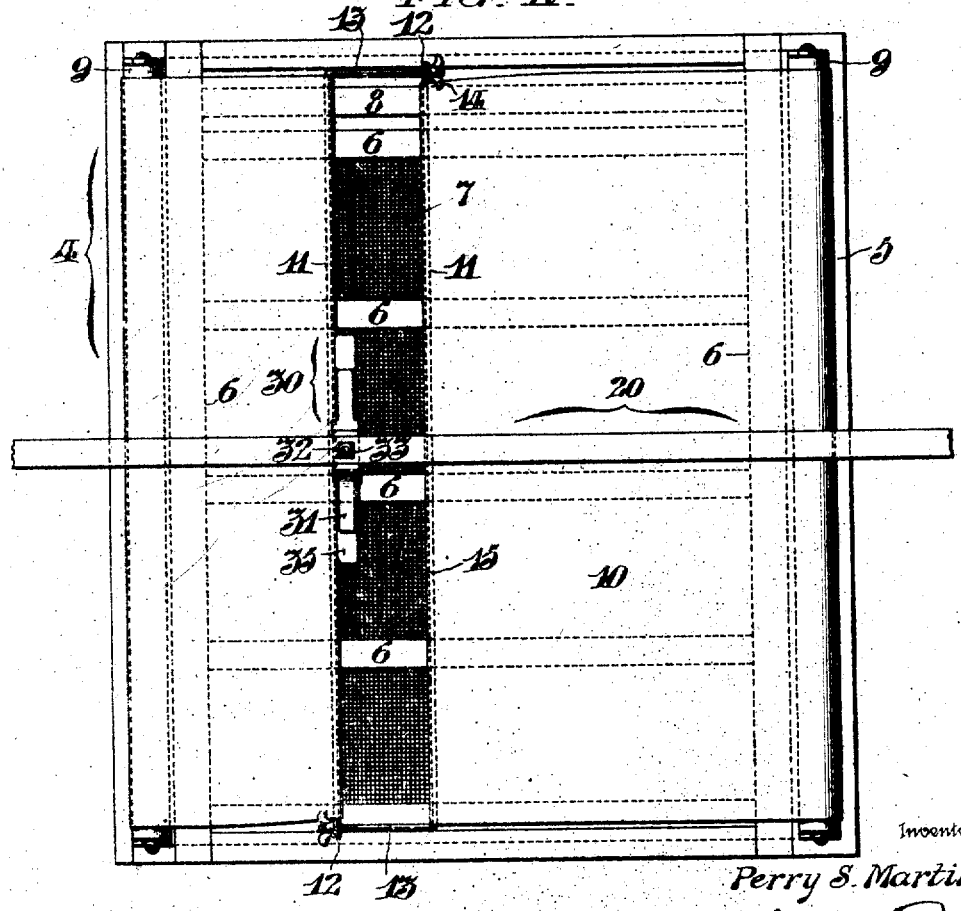
Witnesses
Thomas M. Kerr, Jr.
James H. Bell
Inventor
Perry S. Martin,
by Fulley & Paul
Attorneys

UNITED STATES PATENT OFFICE.

PERRY STOVER MARTIN, OF HARRISONBURG, VIRGINIA, ASSIGNOR TO NEWTON GIANT INCUBATOR CORPORATION, OF HARRISONBURG, VIRGINIA, A CORPORATION OF VIRGINIA.

AUTOMATIC EGG-TURNING DEVICE.

14,673. Specification of Reissued Letters Patent. Reissued June 24, 1919.

Original No. 1,195,705, dated August 22, 1916, Serial No. 7,239, filed February 10, 1915. Application for reissue filed July 24, 1917. Serial No. 182,541.

*To all whom it may concern:*

Be it known that I, PERRY S. MARTIN, of Harrisonburg, in the county of Rockingham and State of Virginia, have invented certain new and useful Improvements in Automatic Egg-Turning Devices, whereof the following is a specification, reference being had to the accompanying drawings.

The invention relates to an automatic egg turning device to be used in connection with incubators, and more particularly to an apparatus and means for turning eggs in multiple compartments.

The object of my invention is to provide a means for turning the eggs in an incubator, which shall be as nearly "hen-like" as possible.

A further object is to provide a plurality of compartments each having an egg tray, so arranged that the eggs in all the trays may be turned at one time by a single means, and also to provide selective means which, if so desired, will prevent the eggs in any one or more trays from being turned, while the eggs in the others are turned.

A still further object is to avoid having any openings which communicate directly with the outside atmosphere and to so arrange the compartments that although the egg turning means passes through all of the compartments, none of the openings necessitated thereby communicates directly with the outside atmosphere.

In any system of incubation it is essential that the eggs should be turned regularly, at least three times a day, until the time when the eggs start pipping, which occurs about the eighteenth day. From this time on the eggs should not be turned or disturbed, or subjected to change of temperature. To this end, I stretch a cloth apron across each of the egg trays, arranged to move over wooden rollers on each side of the tray, and with its ends clasped together at the bottom of the tray. The eggs are placed on top of this apron between strips which render them incapable of lateral movement, but free to rotate. In this position any lateral movement of the apron will tend to rotate the eggs resting upon it, and cause them to turn over. Beneath the tray the ends of the apron are connected by a clasp which is not only adjustable, so that the apron may be kept taut, at all times, but which also makes it possible to loosen and remove the apron when desired.

At each end of the incubator, I provide a windlass, while a band operated thereby passes through each compartment, directly under the egg trays. This band carries a series of catches which engage the apron of the tray situated directly above, so that when the band is moved, by means of cranks attached to the windlasses, the apron in each tray will also move, and cause the eggs to turn over.

In case the eggs in any particular tray have reached the period when they should no longer be turned, the catch is disengaged from the apron of that particular tray, and no further motion will therefore be conveyed to the apron or eggs in that tray, though the eggs in the remaining trays are turned as usual.

Each tray is placed in a separate hatching compartment. These compartments are formed by dividing a single casing with a number of transverse partitions so as to provide a plurality of longitudinally arranged hatching compartments and leave a manifold compartment at each end.

It is, however, essential that the temperature in each compartment be absolutely uniform throughout the whole series of compartments. I, therefore, place one of the windlasses in each of the manifold compartments, so that the turning band which extends between them through all the compartments need only pass through the transverse partitions at no point passing through the outer casing. By this construction the turning band is located wholly within the outer casing of the incubator, so that the only openings necessitated thereby lead from one compartment to another and none lead to the outside atmosphere. Consequently the temperature in all the compartments is substantially uniform.

In the accompanying drawings, Figure I, is a partial elevation and a partial longitudinal sectional view through an incubator, conveniently illustrating the application of my invention thereto.

Fig. II, is a central longitudinal sectional view through one of the trays, showing the actuating catch in active position.

Fig. III, is a similar view illustrating the idle position of the actuating catch.

Fig. IV, is an inverted plan of one of the trays.

Fig. V, is an enlarged detail of the catch for operating the tray aprons.

Fig. VI, is a detail showing the means for connecting the ends of the aprons.

My incubator comprises a casing 1, preferably of wood, divided by a plurality of transverse partitions 1′ to form one or more hatching compartments 2, and two manifold compartments 3, one at either end of the machine. In each hatching compartment is a tray 4, on which the eggs are placed. Each tray consists of an outer frame 5, a series of cross strips 6, supporting surface 7, composed of wire netting or the like, and a movable strip 8, extending across the front of the frame. Two rollers 9, extend transversely of the frame on either side of the wire netting, and are journaled in the frame at either end.

The apron 10, which may be of any coarsely woven cloth or similar substance, extends across the top of the netting 7, around the rollers, and beneath the tray. This apron is made of such length that the ends will not quite meet, but will leave a space between its ends forming a slot 15, the width of the apron, which runs transversely of the tray, as shown in Fig. IV. Rods 11, extend the entire width of the apron, and form rigid edges for the slot 15. They are made with an eye 12, at one end, and bent at right angles at the other to form a link 13, which extends sufficiently forward to bridge the space between the two ends of the apron and engage the eye of the opposing rod, being secured thereto by wing nut 14, which is threaded on the end of link 13. In this way an adjustable clasp is formed, and by tightening one or both of the nuts 14, the apron may be kept sufficiently taut and also be adjusted to run true. By unfastening these nuts, and removing bars 11, the apron can be removed without removing the eggs. This is advantageous as it enables the apron to be removed just before the eggs hatch, which prevents it from becoming soiled. It also permits of the removal of the detachable bar 8, thus leaving an opening through which, if desired, the chicks can drop down to a nursery tray placed beneath the egg tray.

On the upper side of the tray I provide transverse strips 17, set in slots cut in the sides of the frame 5, which are spaced so as to admit two eggs placed longitudinally in the space, between each pair of strips. The eggs so placed will rest directly on the apron 10, but since this lies flat on the wire netting 7, the real support is afforded by this netting. In this position it is evident that any lateral motion of the apron 10, will rotate the eggs and provide the necessary turning. To supply the necessary lateral motion, I employ a band 20, which passes through openings 25, in partitions 1′, and is secured at either end to chains 26, 26, which are in turn secured by means of screws 24, 24, to shafts 21, 21, of windlasses 40, 40, mounted one in each manifold compartment 3. These windlasses are provided with removable cranks 22, having handles 23. By turning these cranks, the band may be moved in either direction. To this band I attach catches 30, placing one beneath each egg tray. These catches consist of crescent shaped blocks 31, placed at right angles to the metal band 20, and attached thereto by bolts 32, and nuts 33. They are made of such a height as to project sufficiently above the metal band 20, to engage the slots 15, so that when the cranks are turned and the metal band moves beneath the trays, the catches will engage the bars 11, which form the sides of the slots 15, and cause the aprons in the trays to move.

Across the top of each of the blocks 31, is mounted a flexible strip 35, which is also bent in the shape of a crescent. When this strip is turned to occupy a position parallel to the catch and perpendicular to the band, it performs no function. But if it is given a quarter of a turn, so that it is at right angles to the block, and the ends allowed to rest on the band 20, as shown in Fig. III, it forms a smooth surface, extending from the metal band to the top of the block, and down again, having slopes so gradual as to produce a relative displacement of the band 20, and the apron 10, laterally in reference to the band and prevent the catch 30, from engaging the slot, or imparting any motion to the apron 10. Therefore, by simply turning the proper strips 35, the eggs in any one or more of the trays can be kept perfectly still while those in the others are being turned. It is obvious that the slot 15, must be kept on the lower side of the tray, and between the rollers. The diameter of the windlasses is such that a half rotation of the same will move the aprons a distance sufficient to turn the eggs slightly more than half a revolution. Each of the cranks 22, is provided at its head with a pointer 27, which through coördination with a pair of fixed studs 28, and 29, indicates just how far to turn the crank.

The operation of my invention is as follows: Referring to Fig. I, the band is ready to be shifted to the right. This may be accomplished by turning the crank at the right hand end of the machine in the direction of the arrow until its pointer 27, registers with the stud 29. The eggs in the trays will thereby be turned as above noted. When the time arrives for the next turning, the same crank 22 (at the right hand end of the machine) is further turned in the direction of the arrow until the pointer 27, again registers with the stud 28. It will here be noted that the motion imparted to the eggs in the first half rotation of the crank is less than that imparted to the second half rotation. This is due to the lost motion occasioned by the width of the belt slots 15, and will be best understood by referring to Fig. II. Through this construction a variable motion is imparted to the eggs, thereby constantly changing the portions of their surface exposed at any particular point. The next two turning operations are performed by resorting to the crank 22, at the left hand end of the machine, which passes through the same cycle of operation as its fellow under the guidance of the studs 28, and 29, at that end of the machine. By thus imparting a slight excess motion to the eggs, *i. e.*, a little beyond a half rotation at one turning, a lesser motion at the next (due to the lost motion in the apron slots), and dividing the function of operation between the two crank handles as above described, a constant variation in the portion of the surface of the eggs exposed at any particular point is effectively obtained.

As before stated, the cranks are removably mounted so that one of them will really suffice for operating the machine by simply transferring from one windlass to the other. For purposes of illustration, however, two of these handles have been shown in active position in Fig. I, so that the operation of the device may be more readily understood.

I have thus provided a simple and efficient means for successfully incubating several sets of eggs in one machine, which will hatch at different periods, and which entails no more labor than turning the cranks of the windlasses at the proper intervals, and seeing that the apron catch is disconnected at the proper time.

I have furthermore provided a single turning means, adapted to operate simultaneously in all the compartments, the band or longitudinally shiftable member of which is wholly inclosed within the incubator casing, so that it does not in any way prevent the insulation of all the compartments from the outside atmosphere.

Having thus described my invention, I claim:

1. In an incubator, the combination of a plurality of egg trays, each tray having a movable apron of pliable material for rotating the eggs; means for uniting the ends of said apron, whereby a transverse slot with rigid edges is provided; longitudinally shiftable mechanism extending beneath all of said trays; means mounted on said mechanism extending sufficiently above said mechanism to engage the edges of said slot.

2. In an incubator, the combination of a plurality of egg trays; rollers running transversely of said trays; a movable apron extending around the rollers in each tray; adjustable clasps connecting the ends of said apron with provision of a transverse slot between its two ends, including rods running transversely of said apron forming rigid edges for said slot; a single longitudinal means extending beneath all of said egg trays; a plurality of catches mounted thereon, adapted to engage the edges of said slots; and means for shifting said longitudinal means.

3. In an incubator, containing a plurality of egg trays, each tray having a movable apron for rotating the eggs; a transverse slot in each apron; a band extending beneath each egg tray; a catch attached to said band beneath each egg tray, extending sufficiently above said band to engage said slot; selective means whereby one or more of said catches may be prevented from engaging said slots; and means for shifting said band.

4. In an incubator, the combination of a plurality of trays for supporting the eggs; movable aprons for rotating the eggs in said trays; a longitudinally shiftable member placed beneath said trays and carrying a plurality of catches; and adjustable strips adjunctive to each of said catches, which, in one position, coöperate to cause the catch to engage one of said aprons and impart lateral motion thereto, and which in another position prevent said catch from engaging the said apron.

5. In an incubator, the combination of a plurality of trays for supporting the eggs; movable aprons for rotating the eggs in said trays; longitudinally shiftable mechanism placed beneath said trays; a plurality of catches carried thereby, adapted to engage said aprons and impart lateral motion thereto, a flexible strip mounted on each catch, whereby said catch may be prevented from engaging said aprons.

6. In an incubator containing one or more egg trays, each tray having a movable apron for rotating the eggs, a transverse slot in each apron, a band extending beneath each egg tray, a catch attached to said band beneath each egg tray, extending sufficiently above said band to engage said slot, and a flexible strip mounted on top of said catch, capable when turned in the direction of the travel of the band, of preventing said catch from engaging said slot.

7. In an incubator, the combination of a plurality of egg trays; movable aprons for rotating the eggs in said trays; a longitudinal band beneath said trays, a plurality of catches carried thereby adapted to engage said aprons; a windlass mounted at either end of said incubator, chains attached to either end of said band and to said windlasses; a removable handle for turning said windlasses and an indicator for determining the direction in which the windlass was last turned.

8. In an incubator, the combination of a casing, transverse partitions dividing said casing to form a plurality of hatching compartments, and also forming a manifold compartment at the end of said casing; means in each of said hatching compartments for turning the eggs therein; a longitudinally shiftable member extending from said manifold compartment through all of said hatching compartments and wholly inclosed within said casing; means for selectively operating all or some of said egg-turning means from said longitudinally shiftable member; actuating means for said longitudinally shiftable member in said manifold compartment, consisting of a shaft at right angles to said shiftable member; and means whereby rotation of said shaft shifts said member, said shaft extending through the wall of the manifold and being provided with external means for turning the same.

9. In an incubator, the combination of a casing having partitions wholly within the casing and dividing the same into a plurality of hatching compartments; an egg tray in each compartment; an egg-turning device for each tray; and a longitudinally movable turning band with selective connections to said egg turning devices located wholly within the casing and extending longitudinally thereof through said partitions for simultaneously actuating any or all of the egg-turning devices.

10. In an incubator comprising a casing; transverse partitions dividing said casing into a plurality of hatching compartments, said partitions having openings extending therethrough; an egg tray in each compartment; an egg-turning device for each egg tray; a longitudinally movable band extending through said openings; means connected with said band for engaging said egg turning devices in each compartment; and means whereby said engaging means may be rendered inoperative in any of said compartments.

11. In an incubator, the combination of a casing with partitions dividing it into a plurality of hatching compartments; means in each compartment for turning the eggs therein; a longitudinally shiftable member extending through all said compartments; and means for selectively connecting said member with any or all of said egg-turning means.

12. In an incubator, the combination of a casing with partitions dividing it into a plurality of hatching compartments; means in each compartment for turning the eggs therein; means for operating said egg-turning means, comprising a member extending through all said compartments; and means for producing relative displacement of the parts laterally in reference to said member to prevent it from actuating the egg-turning means in any one or more of said compartments.

In testimony whereof, I have hereunto signed my name at Harrisonburg, Virginia, this seventeenth day of July, 1917.

PERRY STOVER MARTIN.

Witnesses:

GILBERT R. SPITZER,
ALVA WATERS.